(12) United States Patent
Martin

(10) Patent No.: US 6,215,665 B1
(45) Date of Patent: Apr. 10, 2001

(54) THIN INTEGRATED CIRCUIT CARD COMPRISING AN IMPROVED MANUALLY ACTUATED SWITCH

(75) Inventor: Philippe Martin, Beaune (FR)

(73) Assignee: Gemplus S.C.A., Gemenos (FR)

( * ) Notice: Subject to any disclaimer, the term of this patent is extended or adjusted under 35 U.S.C. 154(b) by 0 days.

(21) Appl. No.: 09/180,071

(22) PCT Filed: Apr. 30, 1997

(86) PCT No.: PCT/FR97/00763

§ 371 Date: May 5, 1999

§ 102(e) Date: May 5, 1999

(87) PCT Pub. No.: WO97/41578

PCT Pub. Date: Nov. 6, 1997

(30) Foreign Application Priority Data

Apr. 30, 1996 (FR) .................................................. 96 05654

(51) Int. Cl.[7] ............................. H05K 7/14; H01H 13/14
(52) U.S. Cl. ........................ 361/737; 361/736; 361/832; 200/530; 235/492; 257/679
(58) Field of Search ..................... 361/724, 736, 361/737, 832; 200/530, 531, 534, 536; 257/679; 235/492; 439/946

(56) References Cited

U.S. PATENT DOCUMENTS

| | | | |
|---|---|---|---|
| 4,405,845 | * 9/1983 | Kondo et al. | 200/408 |
| 4,453,061 | * 6/1984 | Tamura | 200/306 |
| 4,797,542 | * 1/1989 | Hara | 235/380 |
| 4,882,750 | 11/1989 | Henderson . | |
| 5,016,086 | * 5/1991 | Inoue et al. | 361/737 X |
| 5,151,774 | * 9/1992 | Mori et al. | 257/688 |
| 5,455,857 | 10/1995 | McGuire . | |
| 5,696,363 | * 12/1997 | Larchevesque | 200/16 R |
| 5,760,356 | * 6/1998 | Garcia et al. | 200/302.2 |
| 5,818,030 | * 10/1998 | Reyes | 235/492 |

FOREIGN PATENT DOCUMENTS

| | | |
|---|---|---|
| 0664633 | 7/1995 | (EP) . |
| 2436486 | 9/1979 | (FR) . |

* cited by examiner

Primary Examiner—Jayprakash N. Gandhi
(74) Attorney, Agent, or Firm—Roland Plottel

(57) ABSTRACT

A thin integrated circuit card with an improved manually activated switch. The card is of the type that has two external plates, a lower one (12) and an upper one (14) that are separated by at least one interconnecting plate in which there is at least one switch (26). The switch is able to allow or inhibit the passage of an electric current between its two terminals (34). The switch has a pushbutton (28) which is positioned at a peripheral edge (40) of the card.

19 Claims, 2 Drawing Sheets

THIN INTEGRATED CIRCUIT CARD COMPRISING AN IMPROVED MANUALLY ACTUATED SWITCH

BACKGROUND OF THE INVENTION

1. Field of the Invention

The invention relates to a thin integrated circuit card having an improved manually actuated switch.

The invention relates in particular to an integrated circuit card of the type having two external plates, a lower and an upper plate, separated by at least one intermediate plate, of the type in which the plates have electronic components connected to each other by conducting traces, and of the type containing at least one switch able to allow or prohibit passage of an electric current between two of its terminals that are connected to at least one of the traces.

Because new manufacturing techniques have been developed, it is now possible to obtain very small-sized electronic components that can be integrated into cards with a very small total thickness.

2. Description of the Related Art

French Patent Application No. 96.12661 has now proposed an integrated circuit card having both a chip with flush contacts and a circuit for producing sound signals that is connected to a sound transducer, the whole being contained in the total thickness of the card which does not exceed 0.8 mm, which is compatible with the widest-spread standard format for integrated circuit cards.

Such cards, provided with a sound signal producing circuit, can transmit coded information over a classic telephone line, such information serving for example for remote control of various types of apparatus.

This information is generally coded by a principle known in English as "dual tone modulation frequency (DTMF)."

However, the presence of such a circuit requires provision of a trigger switch designed to be actuated by the card user to cause coded signals to be transmitted.

According to the prior art, such switches are made in the form of a deformable dome provided on one of the external faces of the card, which the user must press in the thickness direction of the card to establish an electrical contact between the deformed dome and a conducting area provided opposite the dome on one of the faces of the card.

To trigger such a switch, the user must grip the card in its thickness direction, for example between the thumb and index finger, and he generally applies substantial force to the card which necessarily bends it, particular in the case of very thin cards.

Such bending, repeated regularly, can eventually damage some of the components of the card, which then becomes unusable.

BRIEF SUMMARY OF THE INVENTION

The goal of the invention is thus to provide a switch for a very thin integrated circuit card whose design allows easy manipulation by the user without subjecting the card to excess force.

With this goal, the invention provides an integrated circuit card of the type seen previously, characterized in that the switch has a pushbutton provided at one peripheral edge of the card, which slides in a lengthwise direction in the plane of the card between an active and a resting position, and which controls a contact key designed to connect the terminals of the switch electrically.

According to other characteristics of the invention:

The pushbutton of the switch is guided in a vertical direction perpendicularly to the general plane of card by two faces opposite each other, an upper face and a lower face, of two plates of the card;

The pushbutton of the switch is received at least partially in a slot formed in at least one of the intermediate plates which terminates in a peripheral edge of the card, and whose two lengthwise edges, opposite each other, guide the pushbutton;

The pushbutton of the switch has at least one tab that extends in a transverse direction in the general plane of the card, the tab is received in an opening provided in one of the lengthwise edges of slot of the intermediate plate, and the travel of the pushbutton in the lengthwise direction is determined, in at least one direction, by cooperation of the tab with one lengthwise end transverse edge of the opening;

The pushbutton is in the shape of a plate, it has a rear control edge, in it has two lengthwise side edges that guide it in the slot, the pushbutton has two transverse tabs that extend transversely outward from each of its lateral edges and are received in two openings formed in the lengthwise edges of the slot, and it has a T-shaped cutout of which a lengthwise portion terminates rearward in a transverse portion of the cutout and frontward in a the front edge of the pushbutton;

The pushbutton is returned elastically to its resting position by a return spring;

The return spring is provided between the front edge of the pushbutton and a bottom transverse edge of the slot;

The return spring is provided in the form of a deformable elastic blade whose center portion is supported by the bottom edge of the slot and whose two edges are bent back so that they contact the front edge of the pushbutton on either side of the front edge of the cutout;

The rear edge controlling the pushbutton is flush with the edge of the card when the pushbutton is in the resting position, and the outer plates of the card have, opposite the slot, notches formed in their edges to allow the user to urge the pushbutton lengthwise toward the inside of the card into its active position, particularly by acting on the pushbutton by one of his fingers;

The contact key is parallelepipedic, it is received in the transverse portion of the cutout of the pushbutton, and one front face of the contact key is designed to cooperate with a fixed component of the switch which, when the pushbutton is in the active position, is received inside the lengthwise portion of the cutout of the pushbutton;

The fixed component has two ends connected to the terminals of the switch, which are intended to be connected electrically by the contact key when the pushbutton is in the active position;

The fixed component is an insulator, both of whose ends are metallized and which is intended to be short-circuited by the contact key;

The fixed component is a capacitor, and the contact key is designed to cause the capacitor to discharge;

The contact key of the switch is a conducting pellet made of a polymer material containing conducting particles;

The switch causes an active component of the card to be triggered;

The switch controls a circuit that produces sound signals;

The thickness of the card is approximately 0.8 mm.

Other characteristics and advantages of the invention will emerge from reading the detailed description that follows, for understanding of which reference will be made to the attached drawings wherein:

DETAILED DESCRIPTION OF THE INVENTION

Figure 1:
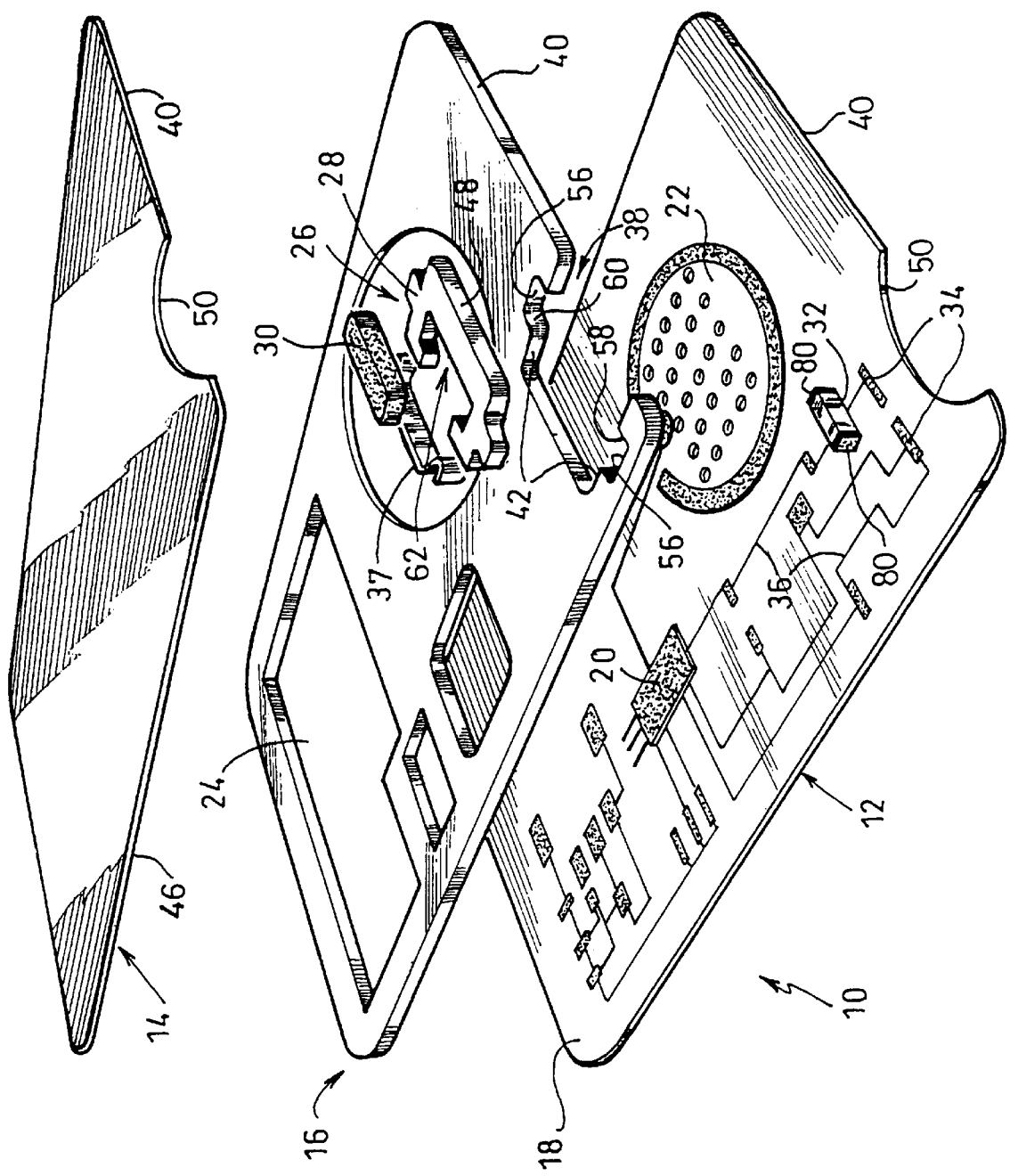
FIG. 1 is a perspective exploded schematic view of an integrated circuit card provided with a switch according to the teachings of the invention.

FIG. 1 shows an integrated circuit card 10 whose structure is essentially composed of two outer plates, a lower plate 12 and an upper plate 14, separated by an intermediate plate 16.

As can be seen in FIG. 1, upper face 18 of lower plate 12 has electronic components connected together by conducting traces to form, among other things, a control circuit for a generator of sound signals supplied to a sound transducer 22.

Card 10 can also have other types of components and circuits (not shown) such as a memory module with flush contacts enabling data to be exchanged with an apparatus provided with a suitable reader.

Intermediate plate 16 is critical to the rigidity of the card and has openings 24, or windows, designed to accommodate the electronic components when card 10 is assembled.

Lower plate 12 is for example approximately 0.2 mm thick while intermediate plate 16 can be between 0.4 and 0.5 mm thick, upper plate 14 being very thin.

In certain cases, upper plate 14 can also carry electronic components.

It would also be possible to provide several stacked intermediate plates, provided with various windows.

Intermediate card 16 can also have metallized areas (not shown) designed to connect some of the circuits contained in the card with each other.

According to the teaching of the invention, card 10 has a switch 26 designed to allow the sound-signal-producing circuit connected to sound transducer 22 to be triggered.

According to a first feature of the invention, switch 26 is designed to be mounted between lower plate 12 and upper plate 14 slidably in a lengthwise direction in the general plane of card 10.

Figure 3:
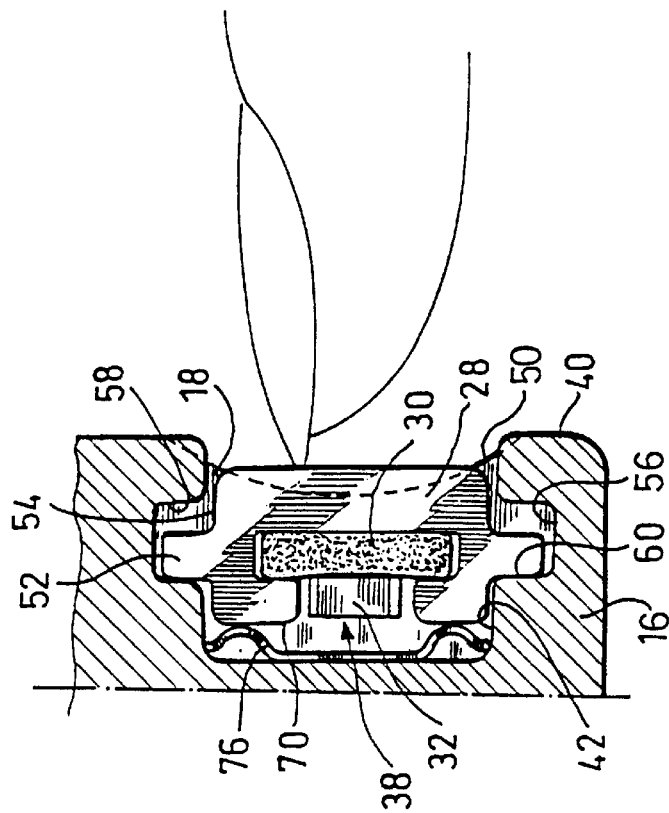
FIGS. 2 and 3 are partial plane views in which the switch according to the invention has been illustrated in the resting position and in the active position.

Switch 26 has an actuating pushbutton 28 provided with a contact key 30 that constitutes the trigger element of switch 26 and is designed to come in contact with a fixed component 32 of switch 26 when pushbutton 28 is urged from a shown in FIG. 3, which component 32 is electrically connected to two terminals 34 of switch 26, the terminals being connected by conducting traces 36 to the control circuit of transducer 22.

A return spring 37 is also provided to continuously urge pushbutton 28 into its resting position.

Pushbutton 28 is an element also in the shape of a plate, with the same thickness as intermediate plate 16, and is guided lengthwise in a slot 38 provided in a rear edge 40 of intermediate plate 16.

Slot 38 has two lengthwise edges 42 that are opposite and parallel to guide pushbutton 28 which is symmetrical with respect to the median lengthwise axis of symmetry X—X of slot 38.

Slot 38 terminates rearward in rear edge 40 of intermediate plate 16 and is delimited lengthwise frontward by a front transverse edge 44.

Slot 38 can advantageously by made simply and precisely by cutting with a high-pressure water jet or by laser cutting.

When card 10 is assembled, pushbutton 28 is then able to slide lengthwise in slot 38 and is guided, in a direction of the general plane of card 10, by opposite inside faces 18, 46 of lower plate 12 and upper plate 14 is open lengthwise rearward in edge 40 of card 10, and which close off slot 38 below and above.

Where several intermediate plates 16 exist, the thickness of pushbutton 28 may be such that it does not exceed the thickness of one of these intermediate plates, and pushbutton 28 is then guided between one of outside plates 12, 14 and an intermediate plate that has no guide slot.

Figure 2:
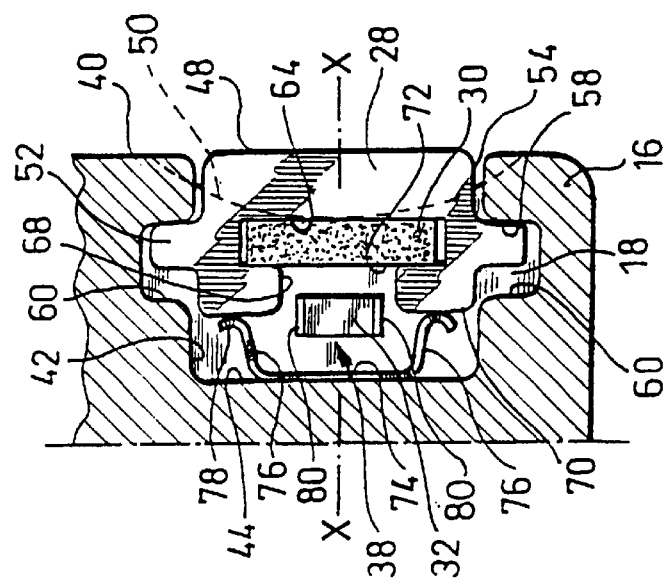

Plate-shaped pushbutton 28 has a rear control edge 48 which is flush with rear edge 40 of intermediate plate 16 when pushbutton 28 is in its resting position shown in FIG. 2. Moreover, outer plates 12, 14 are each provided with a notch 50 opposite the rear end of slot 38 so that the user can act on rear edge 48 of the pushbutton to urge it lengthwise in the direction of the inside of the card, toward the bottom of slot 38, up to its active position shown in FIG. 3.

By preventing pushbutton 28 from projecting beyond the side edges of the card, it is prevented from being inadvertently pushed into its active position.

The lengthwise travel of pushbutton 28 in slot 38 is determined by two tabs 52 that extend transversely in the general plane of card 10 from two lengthwise lateral edges 54 of pushbutton 28 which cooperate with the lengthwise edges 42 of slot 38 to guide pushbutton 28.

Tabs 52 are received in openings 56 cut transversely into lengthwise edges 42 of slot 38.

Openings 56 are delimited lengthwise by rear transverse edge 58 and front transverse edge 60 with which tabs 52 cooperate to determine the resting position and active position, respectively, of pushbutton 28.

The travel of pushbutton 28 can for example be approximately 0.5 mm.

Pushbutton 28 is provided with a T-shaped cutout having essentially a transverse part 64 arranged substantially in the center of pushbutton 28 and a lengthwise part 68 that extends along axis of symmetry X—X of switch 26 and which terminates rearward at transverse portion 64, and frontward at a front transverse edge 70 of pushbutton 28.

Contact key 30, which is parallelepipedic in shape, is designed to be inserted vertically into transverse portion 64 of cutout 62 in order to have a front face portion 72 which forms a rear transverse bottom for lengthwise portion 68 of cutout 62.

Key 30 is of substantially the same thickness as pushbutton 28 and as intermediate plate 16 so that it is also held in the direction perpendicular to the general plane of card 10 by outer plates 12, 14 with no need for additional fastening means.

Spring 37 that returns pushbutton 28 to its resting position is composed of a deformable blade that has a central portion 74 supported by the rear transverse edge 44 of slot 38. Central portion 74 is extended on each side by arms 76 that are bent rearward lengthwise in the plane of card 10 and whose free ends 78, bent back transversely outward relative to axis of symmetry X—X, rest on front transverse edge 70 of pushbutton 28 on outer side of the front lengthwise end of the two lengthwise portion 68 of cutout 62.

Thus, when pushbutton 28 is urged lengthwise into its active position, arms 76 of pushbutton 28 are elastically bent transversely outward, and when the user releases the pressure on rear edge 48, pushbutton 28 is returned to its resting position.

There are various options for the choice of fixed component 32 of switch 26.

Fixed component 32 can for example be a pellet made of a ceramic insulator, substantially parallelepipedic in shape, whose two transverse end sections 80 are metallized and connected electrically to terminals 34 of switch 26.

Fixed component 32 is then joined to upper face 18 of lower plate 12 such that, when pushbutton 28 is in the active position, fixed component 32 is received in lengthwise portion 68 of cutout 62 of pushbutton 28, and front face 72 of contact key 30 electrically connects the two ends 80 of fixed component 32 which has the result of closing an electrical circuit enabling control circuit 20 to trigger the production of sound signals.

Switch 26, here of the normally open type, can also be of the normally closed type.

Fixed component 32 can also be made in the form of a capacitor with a similar structure. Current techniques allow capacitors 0.35 mm thick to be manufactured inexpensively and reliably.

When key 30 comes in contact with fixed component 32, it causes the capacitor, which had previously been electrically charged, to discharge, causing the difference in voltage at terminals 34 of switch 26 to drop suddenly, and this signal can be detected by control circuit 20.

In both cases, it is advantageous to use a contact key 30 made in the form of a polymer material containing conducting particles.

Indeed, a "negative" play can be provided between front face 72 of contact key 30 and fixed component 32 when pushbutton 28 is in the active position, namely its front face 72 is slightly in front of a rear face of component 32.

Front face 72 is then able to deform so that, on the one hand, it can be in perfect contact with fixed component 32 in order to provide a reliable electrical connection between the two metallized ends 80 of fixed component 32 and, on the other hand, to limit the stresses transmitted to fixed component 32 that could tear it off lower plate 12.

Moreover, this enables manufacturing tolerances of such a switch 26 to be increased to the benefit of the production cost.

Such a design for switch 26 in card 10 enables the forces necessary for manipulating switch 26 to be directed in the general plane of card 10, preventing it from being deformed without its thickness having to be increased. However, such a switch can also be used in thicker cards, while preserving the benefit of simplicity of production and use.

Of course, such a design for switch 26 can readily be used to control all types of integrated circuits in a thin card.

Moreover, such a switch is small in size, so that several switches can be provided on the same card to carry out different functions.

What is claimed is:

1. Integrated circuit card comprising two external plates, a lower plate (12) and an upper plate (14), separated by at least one intermediate plate (16), electronic components connected to each other by conducting traces (36) on at least one plate, at least one switch (26) with two terminals to allow or prohibit passage of an electric current between the two terminals (34) that are connected to at least one of the traces (36), pushbutton (28) provided at one peripheral edge (40) of the card (10), which slides in a lengthwise direction in the plane of the card between an active and a resting position, and which controls a contact key (34) designed to connect the terminals (34) of switch (26) electrically, the pushbutton (28) of switch (26) being slidable mounted in a slot (38) formed in at least one of the intermediate plates (16), which terminates in the peripheral edge (40) of card (10), and whose two lengthwise edges (42), opposite each other, guide pushbutton (28).

2. Integrated circuit card according to claim 1 wherein said pushbutton (28) in the resting position, has its outer peripheral flush with or slightly inside the edge (40) of the card (10).

3. An integrated circuit card comprising two external plates, a lower plate (12) and an upper plate (14), separated by at least one intermediate plate (16), at least one of the plates having electronic components thereon connected to each other by conducting traces (36), at least one manually operable switch (26) having a normal resting position and an activated position for controlling passage of an electric current between two terminals (34) connected to at least one of the traces (36), said switch (26) has a manual operated pushbutton (28) located at one peripheral edge (40) of the card (10), said pushbutton being movable from the normal position at the edge inwardly towards an interior of said card sliding in a direction parallel to a major plane of the card, and a contact key (30) controlled by said pushbutton and movable in the same direction as said pushbutton, and when in said activated position said key connects the terminals (34) of the switch (26) electrically.

4. Integrated circuit card according to claim 3 wherein pushbutton (28) of switch (26) is guided in a direction parallel to the general plane of card (10) by two faces opposite each other, an upper face (18) and a lower face (46), respectively, of said two plates (12, 14) of card (10).

5. Integrated circuit card according to claim 3 wherein the pushbutton (28) of switch (26) moves at least partially in a slot (38) formed in at least one of the intermediate plates (16), which terminates at the peripheral edge (40) of card (10), and having two lengthwise edges (42), opposite each other, for guiding said pushbutton (28) in said slot.

6. Integrated circuit card according to claim 5, wherein said pushbutton (28) of switch (26) has at least one tab (52) that extends in a transverse direction in the general plane of card 910), said tab (52) being received in an opening (56) provided in one lengthwise edge (42) of slot (38) of intermediate plate (16), whereby the travel of pushbutton (28) in the lengthwise direction is determined, in at least one direction, by cooperation of tab (52) with one lengthwise end of transverse edge (58, 60) of opening (54).

7. Integrated circuit card according to claim 6, wherein pushbutton (28) is in the shape of a plate with a rear control edge (48) and two lengthwise side edges (54) that guide said pushbutton in slot (38), said pushbutton (28) has two transverse tabs (52) that extend transversely outward from each of its lateral edges (54) and are received in two openings (56) formed in lengthwise edges (42) of slot (38), and said pushbutton has a T-shaped cutout (62) of which a lengthwise portion (68) terminates rearward in a transverse portion (64) of the cutout and frontward in a front edge (70) of pushbutton (28).

8. Integrated circuit card according to claim 7 further comprising a return spring (37) provided between the front edge (70) of pushbutton (28) and a bottom transverse edge (44) of slot (38).

9. Integrated circuit card according to claim 8, wherein the return spring (37) is a deformable elastic blade having a center portion (74) supported by bottom edge (44) of slot (38) and two edges (76) being bent back so that they contact front edge (70) of pushbutton (28) on either side of the front edge (68) of the cutout (62).

10. Integrated circuit card according to claim 7 wherein rear edge (48) controlling pushbutton (28) is flush with edge (40) of card 910) when pushbutton (28) is in the resting position, and the outer plates (12, 14) of card (10) have, positioned opposite slot (38), notches (50) formed in their edges (40) to allow a user to urge pushbutton (28) lengthwise into its active position toward the inside of card (10), whereby activating the switch by acting on pushbutton (28) by one of the users fingers.

11. Integrated circuit card according to claim 7 wherein contact key (30) is parallelpipedic shaped and moves with the transverse portion (64) of cutout (62) of pushbutton (28), and one front face (72) of contact key (30) being designed to cooperate with a fixed component (32) of switch (26) which, when pushbutton (28) is in the active position, is inside the lengthwise portion (68) of cutout (62) of pushbutton (28).

12. Integrated circuit card according to claim 11, wherein fixed component (32) has two ends (80) connected to terminals (34) of switch (26), which are connected electrically by contact key (30) when pushbutton (28) is in the active position.

13. Integrated circuit card according to claim 12, wherein the fixed component (32) is an insulator, whose ends (80) are metallized and which is short-circuited by contact key (30) in the active position.

14. Integrated circuit card according to claim 3 wherein the pushbutton (28) is returned elastically to its resting position by return spring (37).

15. Integrated circuit card according to claim 3, wherein fixed component (32) is a capacitor, and contact key when in the active position (30) causes the capacitor to discharge.

16. Integrated circuit card according to claim 3, wherein contact key (30) of switch (26) is a conducting pellet made of a polymer material charged with conducting particles.

17. Integrated circuit card according to claim 3, wherein switch (26) when in the active position causes an active component (20, 22) of card (10) to be triggered.

18. Integrated circuit card according to claim 17, wherein switch (26) controls a circuit (20) producing sound signals.

19. Integrated circuit card according to claim 3, wherein the thickness of card (10) is approximately 0.8 mm.

* * * * *